(12) United States Patent
Turner et al.

(10) Patent No.: US 10,389,641 B2
(45) Date of Patent: Aug. 20, 2019

(54) NETWORK OPERATION

(71) Applicant: BRITISH TELECOMMUNICATIONS PUBLIC LIMITED COMPANY, London (GB)

(72) Inventors: Michael Turner, London (GB); Alexander Healing, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 15/563,018

(22) PCT Filed: Mar. 30, 2016

(86) PCT No.: PCT/EP2016/056959
§ 371 (c)(1),
(2) Date: Sep. 29, 2017

(87) PCT Pub. No.: WO2016/156431
PCT Pub. Date: Oct. 6, 2016

(65) Prior Publication Data
US 2018/0198718 A1    Jul. 12, 2018

(30) Foreign Application Priority Data

Mar. 31, 2015   (EP) .................................... 15275103

(51) Int. Cl.
*H04L 12/851* (2013.01)
*H04L 12/24* (2006.01)

(52) U.S. Cl.
CPC ...... *H04L 47/2441* (2013.01); *H04L 41/0631* (2013.01); *H04L 41/0816* (2013.01); *H04L 41/145* (2013.01); *H04L 41/28* (2013.01)

(58) Field of Classification Search
CPC ............. H04L 47/2441; H04L 41/0631; H04L 41/0816; H04L 41/145; H04L 41/28
See application file for complete search history.

(56) References Cited

U.S. PATENT DOCUMENTS 8,244,857 B2 *  8/2012  Jakob .................... H04L 67/104
370/249
8,364,141 B1 *  1/2013  Kateley ................. H04W 24/08
455/423

(Continued)

FOREIGN PATENT DOCUMENTS

WO    WO 2012/125137         9/2012

OTHER PUBLICATIONS

International Search Report for PCT/EP2016/056959, dated Jun. 14, 2016, 3 pages.

(Continued)

*Primary Examiner* — Brian T O Connor
(74) *Attorney, Agent, or Firm* — Nixon & Vanderhye PC

(57) ABSTRACT

A method of operating a communications network is disclosed. In order to manage a network, it is first necessary to establish the state the network is in. This is difficult in practice because the network operational data stored and transmitted in the network takes a myriad of forms owing to the variety of suppliers and types of network equipment. There is a need to distil that network operational data down to aggregate network operational data which can be taken to provide an indication of the state of the network which is of a manageable size, and to which network management apparatus can react by sending control commands to the network. The problem of generating aggregate network operational data is difficult because of the heterogeneity of network operational data items. By finding attribute names in different network operational data items which match one another, and then comparing attribute values provided from (Continued)

those matching attribute names, a comparison of heterogeneous network operational data items is enabled. This enables the production of network aggregate data which more accurately reflects the operational state of the network. This in turn leads to the network management apparatus controlling the network to operate in a more efficient manner than has hitherto been possible.

20 Claims, 11 Drawing Sheets

(56) References Cited

U.S. PATENT DOCUMENTS

| | | | |
|---|---|---|---|
| 8,504,488 B2 * | 8/2013 | Dutta | G06Q 30/02 706/12 |
| 8,832,109 B2 * | 9/2014 | Ghanea-Hercock | H04L 67/16 707/737 |
| 10,091,668 B2 * | 10/2018 | Kateley | H04W 24/08 |
| 2003/0110398 A1 | 6/2003 | Dacier et al. | |
| 2008/0291918 A1 | 11/2008 | Turcot | |
| 2008/0320549 A1 | 12/2008 | Bertino et al. | |
| 2009/0172687 A1 | 7/2009 | Bobak et al. | |
| 2010/0150008 A1 | 6/2010 | Sohn et al. | |
| 2010/0228854 A1 | 9/2010 | Morrison et al. | |
| 2013/0157688 A1 * | 6/2013 | Kateley | H04W 24/08 455/456.1 |
| 2013/0246422 A1 * | 9/2013 | Bhargava | G06F 16/35 707/737 |
| 2013/0305357 A1 | 11/2013 | Ayyagari et al. | |
| 2013/0318015 A1 * | 11/2013 | Dutta | G06Q 30/02 706/12 |
| 2014/0129371 A1 * | 5/2014 | Wilson | G06Q 30/02 705/26.7 |
| 2015/0047034 A1 * | 2/2015 | Burnham | H04L 63/1425 726/23 |
| 2015/0304346 A1 | 10/2015 | Kim | |
| 2015/0356174 A1 * | 12/2015 | Narayana | G06F 16/35 707/738 |
| 2016/0285707 A1 | 9/2016 | Pawlowski et al. | |
| 2018/0091377 A1 * | 3/2018 | Turner | H04L 63/20 |
| 2018/0227190 A1 * | 8/2018 | Healing | H04L 41/142 |

OTHER PUBLICATIONS

International Search Report for PCT/EP2016/056962, dated Jun. 8, 2016, 4 pages.
Written Opinion of the ISA for PCT/EP2016/056959, dated Jun. 14, 2016, 8 pages.
Office Action dated Apr. 11, 2019, issued in Turner, U.S. Appl. No. 15/562,682, filed Sep. 28, 2017 (13 pages).

* cited by examiner

| id | 4 |
|---|---|
| Source IP Address | 10.98.210.15 |
| Source Port | 19554 |
| Destination IP Address | 10.98.214.76 |
| Destination Port | 19274 |
| Flow length Byte | 127546 |
| Flow length Byte | 213868 |
| Flow length Byte | 5124 |
| Severity | 5 |

Figure 4

| | |
|---|---|
| Source IP Address | IP Address |
| Source Port | Nominal |
| Destination IP Address | IP Address |
| Destination Port | Nominal |
| Flow length Byte | Quantitative |
| Severity | Ordinal |

Figure 5

| Attribute Name | Frequency in First Data Item | Frequency in Second Data Item | Attribute Value Similarity Weight |
|---|---|---|---|
| <source address> | 1 | 1 | 1 |
| <source port> | 1 | 1 | 1 |
| <destination address> | 1 | 1 | 1 |
| <destination port> | 1 | 1 | 1 |
| <flow bytes> | 3 | 2 | 2.5 |
| <severity> | 1 | 1 | 1 |

Figure 8

NETWORK OPERATION

This application is the U.S. national phase of International Application No. PCT/EP2016/056959 filed 30 Mar. 2016 which designated the U.S. and claims priority to EP Patent Application No. 15275103.8 filed 31 Mar. 2015, the entire contents of each of which are hereby incorporated by reference.

BACKGROUND AND SUMMARY

The present invention relates to the operation of a communications network.

The number and variety of individual communications handled by a modern communications network is vast. In order to make the handling of those disparate communication tasks tractable, network operators automatically classify communications tasks and apply treatment which is common to the members of each class, but which differs between classes. One example is the automatic assignment of communications into quality of service classes, with communications placed in the same service class being given common treatment.

In some situations, the classification of network operational data describing, for example, the state of network elements, network traffic or network events, needs to change as the state of the network changes. Examples include handling cyberattacks on the network, network faults or fraudulent usage of the network.

In addition to carrying user communications, modern communication networks store and transmit a great deal of management traffic which relates to the operation of the network. Because there are a myriad of management functions which need to be performed in a modern communications network, and since those functions are in practice performed by equipment provided by various equipment manufacturers at various times over the past several decades, the network operational data is, in practice, found in a variety of different structural forms. It is this network operational data which needs to be processed in order to generate a dynamic classification of network elements, traffic or events.

Network operational data items are typically characterised by a plurality of attributes, each attribute having an attribute name, and one or more attribute values associated with that attribute name.

In a paper entitled 'An SR-ISODATA Algorithm for IDS Alerts Aggregation' by Chun Long et al, published in the proceedings of the IEEE International Conference on Information and Automation 2014, the authors describe a system for aggregating alerts from an intrusion detection system (IDS). The intrusion detection system assumes that the IDS data is in a standard intrusion alert data format (Intrusion Detection Message Exchange Format) and is thus able to parse that data to extract values of seven named attributes selected by the authors before the alert aggregation is performed.

US Patent application 2003/0110398 proposes tackling the large number of alarms by defining taxonomies of the values of attributes of the alarms. The difference between two attributes is then considered to be the number of generalization steps that need to be taken in the taxonomy before a class to which both attributes belong is found. The difference between two alarms is then defined as the sum of the attribute differences. Cluster similarity is then defined as reciprocal of the normalised sum of the differences between each alarm in a set of alarms and the most specific class which encompasses all the alarms in the set, and alarm clusters are calculated accordingly.

Neither the paper nor the patent application teaches a method which handles situations where a first and/or a second network operational data item gives a plurality of attribute values in association with a given attribute name, or where the set of attribute names found in a first data item differs from the set of attribute names found in a second data item. In such cases, the difficulty of carrying out a straightforward comparison between the first and second network operational data items precludes the use of conventional clustering techniques.

The complexity of modern communications networks means there is a need to automatically classify network operational data in order to enable the common treatment of network elements, traffic or events found to belong to the same class, and thus enable the more efficient operation of a communications network. The heterogeneity of network operational data items found in practice has, until the advent of the present invention, made this impractical.

According to the present invention, there is provided a method of operating a communications network comprising:
  obtaining a plurality of network operational data items relating to the operation of said communications network, each of said network operational data items comprising one or more attributes, each attribute comprising an attribute name and one or more values for that attribute;
  calculating, for each two-way combination of network operational data items, a data item similarity measure by:
    i) identifying one or more commonly named attributes in the two network operational data items; and
    ii) calculating, for each of said one or more commonly named attributes, an attribute value similarity measure;
  classifying network operational data items into classes in dependence upon said data item similarity measures; and
  automatically applying common treatment in response to network operational data items in one or more of said classes.

Attributes have an attribute name and an associated attribute value. A first and a second data item have a commonly named attribute when the first data item has an attribute with an attribute name which is the same as the name of an attribute found in the second data item.

By operating a communications network to:
  obtain a plurality of network operational data items relating to the operation of said communications network, each of said network operational data items comprising one or more attributes, each attribute comprising an attribute name and one or more values for that attribute, and then
  calculate, for each two-way combination of network operational data items, a data item similarity measure by:
    i) identifying one or more commonly named attributes in the two network operational data items; and
    ii) calculating, for each of said one or more commonly named attributes, an attribute value similarity measure;
  classify the plurality of network operational data items into classes in dependence upon said data item similarity measures; and
  automatically apply common treatment in response to network operational data items in one or more of said classes,
a method of operating a communications network is provided which can take account of heterogeneous network operational data items in building up, in the form of a classification of network operational data items, aggregate data representing the operational state of the communications network.

By then applying common treatment to network operational data items in one or more of the classes of network operational data items thus identified, it is possible to operate a communications network more efficiently than has yet been possible.

Examples of common treatment include giving the network elements, traffic or events represented by network operational data items assigned to the same class the same level of priority, or where the network elements, traffic or events are malicious handling them with the same countermeasure.

In some embodiments, at least one of the network operational data items provides a plurality of values for one or more of the commonly named attributes, said attribute value similarity measure calculation comprising:

i) finding, for each of the plurality of values provided for said commonly named attribute in said at least one network operational data item, an attribute value similarity component with respect to each of the one or more values provided for said commonly named attribute in the other network operational data item; and ii) aggregating the attribute value similarity components to calculate said attribute value similarity measure.

This enables the operation of the network to take into account network operational data items which provide plural values in association with a single attribute name. By taking more network operational data items into account, the classification better reflects the state of the communications network, and the automatic common reaction to classes of network data items causes the automatic operation of the network to be even more efficient.

Advantageously, the aggregation of said attribute value similarity components comprises calculating a weighted sum of said attribute value similarity components in which higher attribute value similarity components are given a higher weight than lower attribute value similarity components. This tends to counteract the dilution in similarity which results from any distribution of the values provided in association with the commonly named attribute in the two data items.

The weighted sum can take many forms, including only taking into account the n highest attribute value similarity components, where n is fewer than the total number of possible attribute value similarity components.

In some embodiments, the method further comprises data obtaining, in relation to one or more of said attribute names, a data type indication indicating the type of data values provided for that attribute, said attribute value similarity measure calculation depending upon said data type indication.

By calculating said attribute value similarity measure in a manner which depends upon the type of data values provided in association with a given attribute name, a data item similarity measure which more accurately reflects the similarity between two network operational data items is calculated, leading to a classification of the network data items which more accurately reflects the operation of the network, and thus leading to a more appropriate application of common treatment in response to network operational data items which are found to be similar.

In some embodiments, the method further comprises providing an administrator with a user interface enabling the selection of a subset of said attribute names to be taken into account in classifying said network operational data items. This has the advantage that the classification process can run more quickly since it is focussed on fewer attributes. Because the administrator can select those attributes which he or she believes best characterise the data items, the increase in speed can be gained without a correspondingly large drop in the accuracy of the aggregate network operational data thus created.

According to another aspect of the present invention, there is provided a computer-implemented method of classifying network operational data comprising:

obtaining a plurality of network operational data items relating to the operation of said communications network, each of said network operational data items comprising one or more attributes, each attribute comprising an attribute name and one or more values for that attribute;

calculating, for each two-way combination of network operational data items, a data item similarity measure by:
i) identifying one or more commonly named attributes in the two network operational data items; and
ii) calculating, for each of said one or more commonly named attributes, an attribute value similarity measure; and classifying network operational data items into classes in dependence upon said pairwise data item similarity measures.

By obtaining a plurality of network operational data items relating to the operation of said communications network, each of said network operational data items comprising one or more attributes, each attribute comprising an attribute name and one or more values for that attribute, and then calculating, for each two-way combination of network operational data items, a data item similarity measure by:
i) identifying one or more commonly named attributes in the two network operational data items; and
ii) calculating, for each of said one or more commonly named attributes, an attribute value similarity measure;
and thereafter classifying network operational data items into classes in dependence upon said pairwise data item similarity measures, classes of network operational data items are provided, enabling the operation of the communications network to which the network operational data relates to be made more efficient by operating the communication network to provide a common reaction to network operational data items classified as belonging to the same class.

There now follows, by way of example only, a description of one or more embodiments of the invention. This description is given with reference to the accompanying drawings, in which:

BRIEF DESCRIPTION OF THE DRAWINGS

FIG. 4 shows an example of a data item loaded into a generic data structure used in the present embodiment;

FIG. 5 shows the statistical data type of values provided in association with each attribute name common to two example network operational data items;

FIG. 8 shows a common attribute similarity weight table built when the process of FIG. 7 is carried out;

DETAILED DESCRIPTION OF THE INVENTION

In a first embodiment, a network security system (FIG. 1) is used to deploy and provide a managed security service that monitors a customer's network activity using a customer network management node 20 which collects status data from monitored components and transmits that status data to a secure operations centre 40 ("SOC").

The managed security service is not intended to replace but to supplement, and thereby render more effective, a customer's existing preventive security products. Such products, which can include firewalls, servers, routers, intrusion detection systems, and other security products, can generate millions of lines of audit information each day. Buried in all that information may be the footprints of ongoing network attacks or intrusions. The managed security service can help filter and analyze all of that audit information in real time to detect and then counter such attacks or intrusions.

Figure 1:
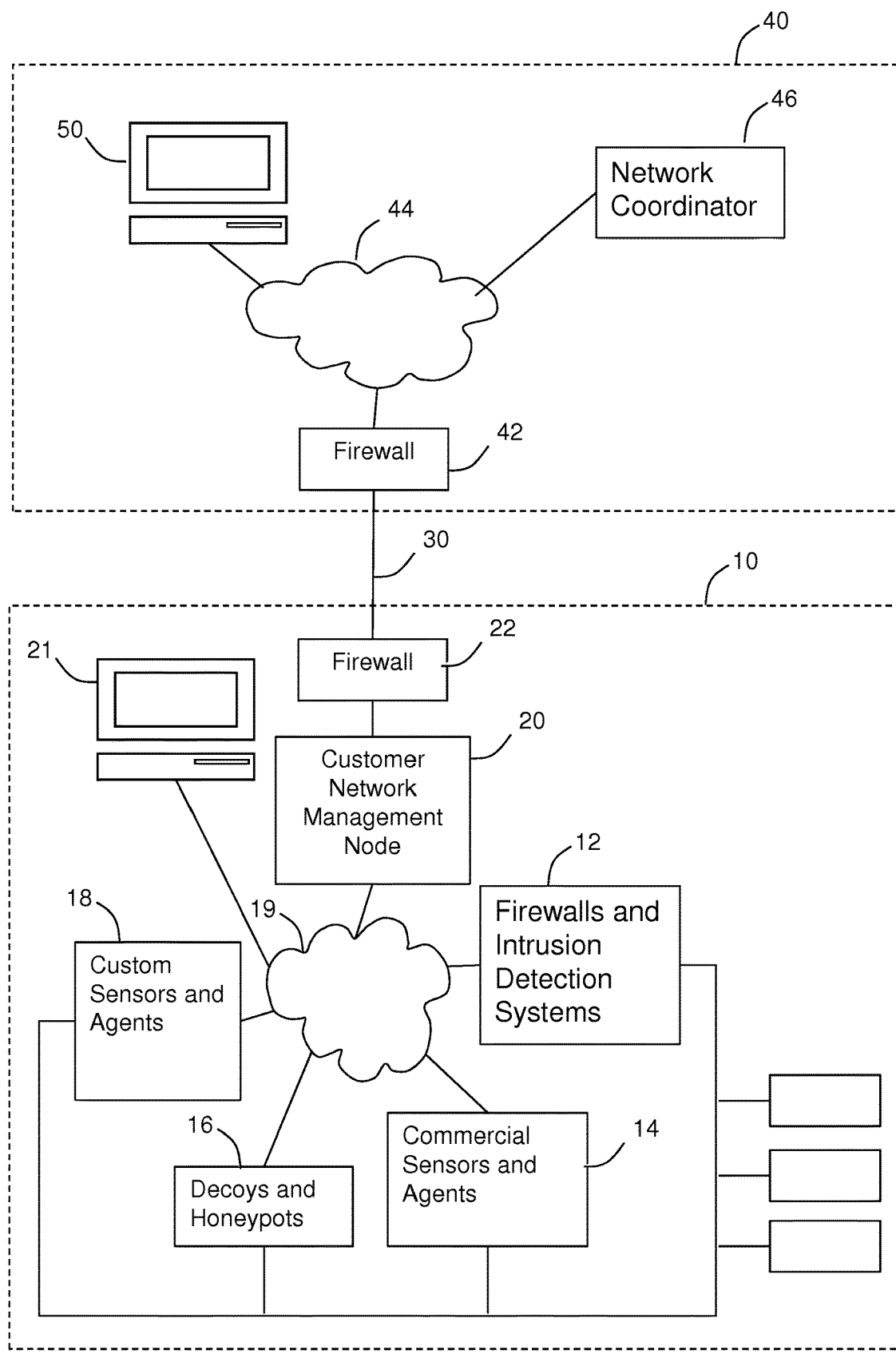
FIG. 1 shows a corporate network management system according to an embodiment of the present invention.

FIG. 1 is an overview of the systems deployed to provide the managed security service. FIG. 1 is divided into two portions; components and systems that operate on the customer site 10 (that is, within the customer's firewall 22) and components and systems that operate within the SOC 40 (that is, behind the SOC firewall 42). A single SOC can monitor and service multiple customer sites, and a single customer site can be monitored by multiple customer network management nodes. For ease in understanding, this discussion assumes a single SOC servicing a single customer site being monitored by a single customer network management node.

Customer network management node 20 monitors sensors attached to customer network 10 for evidence of potential security-related events happening on network 10. Such sensors can include firewalls and intrusion detection systems 12, commercially available sensors and agents 14, decoys and honeypots 16 (monitored devices or programs designed to attract the attention of, and thereby expose, a would-be intruder), and custom sensors and agents 18. More generally, customer network management node 20 can monitor and collect information from any network component that can be configured to send or provide to it status data (including audit log data and other audit information) concerning the status of network 10 and its components. The customer network management node 20 operates in accordance with configuration commands provided via administration console 21, which communicates with the customer network management node via internal communications network 19.

Both sensors and agents can monitor network components. However, while typically a sensor passively receives status data from network components set up to send such data to the sensor, an agent is designed to actively seek such data from the components it is monitoring. Sensors may include scanning engines, syslog data providers (including devices such as routers and firewalls), Simple Mail Transfer Protocol ("SMTP") sensors, Simple Network Management Protocol ("SNMP") sensors and SNMP traps. SNMP sensors generally require polling and may require additional software provided as part of the managed security service, whereas SNMP traps generally send data directly, without prompting. Sensors and agents may be customized for the particular needs of a customer's network, for example, to provide information not provided by those sensors and agents that are commercially available.

Customer network management node 20 collects the constantly updated status data it receives from sensors and agents, carries out administrative processing of the status data (including loading the status data into a generic data structure), and provides the processed status data to the security operations centre 40 for analysis (e.g., cross-customer analysis). As will be explained below, the customer network management node 20 may be updated during actual operation with network management policies or rules. Such updates can be sent from the SOC 40 to the customer network management node 20 and signed, verified and then securely installed. The updates can be controlled by network coordinator 46 within SOC 40.

The communications link 30 provides an encrypted, secure communications path and message protocol for messages sent back and forth between customer network management node 20 and the SOC 40. The communications protocol used over communications link 30 preferably runs inside a Transport Layer Security ("TLS") session or other protected path. Either side can send individual messages containing identification information and a payload.

The security operations centre 40 comprises a network coordinator 46, a firewall 42 and a network management console 50, all of which are interconnected via internal network 44. The network management console 50 provides an interface allowing a security analyst to interact with the network coordinator 46. The firewall 42 receives the communication link 30 from the customer network 10.

Figure 2:
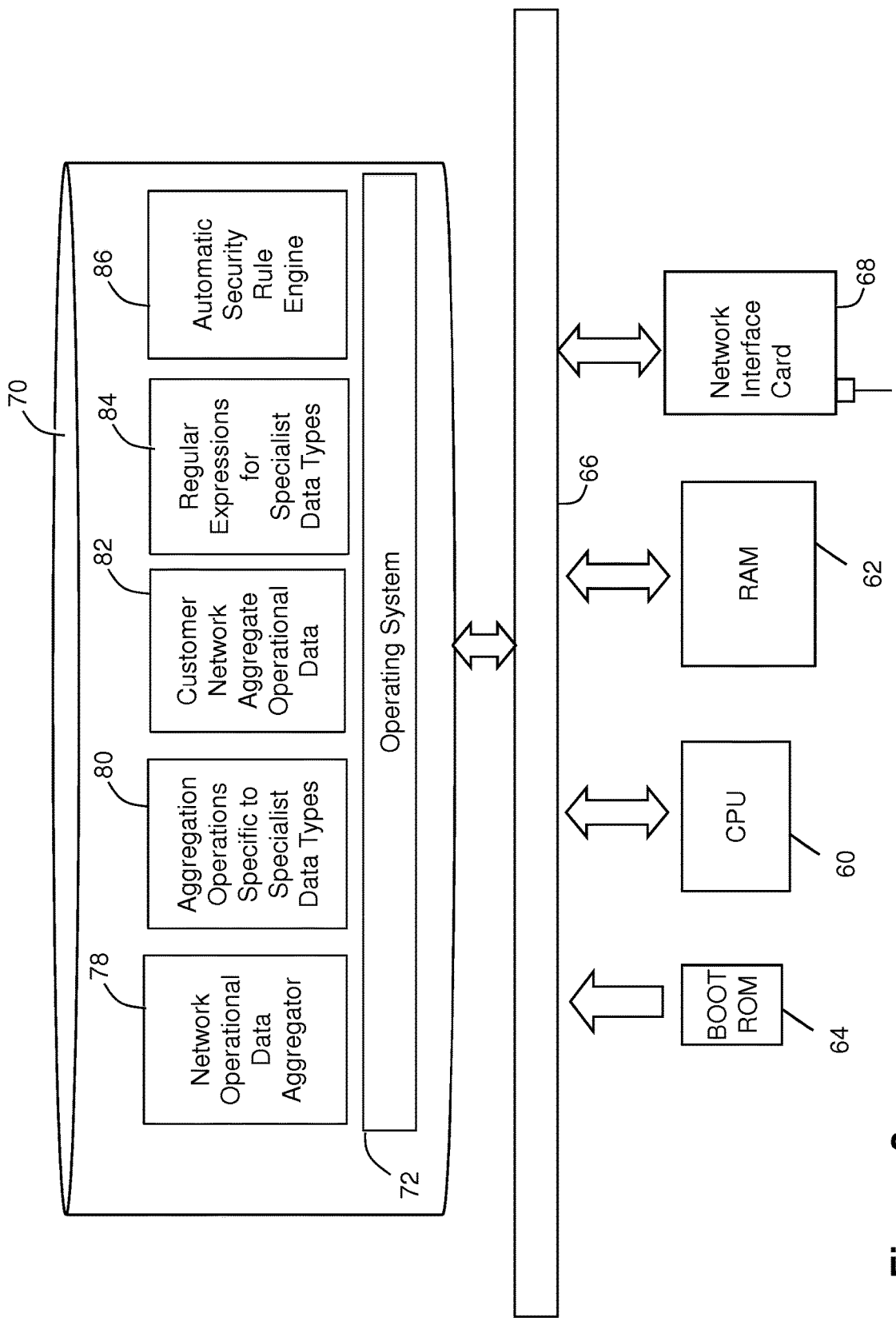
FIG. 2 shows the architecture of a network coordinator in the embodiment.

The network coordinator 46 comprises (FIG. 2) a central processing unit 60, a volatile memory 62, a read-only memory (ROM) 64 containing a boot loader program, and writable persistent memory—in this case in the form of a hard disk 70. The processor 60 is able to communicate with each of these memories via a communications bus 66.

Also communicatively coupled to the central processing unit 60 via the communications bus 66 is a network interface card 68. The network interface card 68 provides a communications interface between the network coordinator 46 and the internal network 44. Thus, the network interface card 68 provides a communications interface between the network coordinator 46, and, via the firewall 42 and the communications link 30, the customer network management node 20.

The hard disk 70 of the network coordinator 46 stores:
i) an operating system program 72,
ii) a network operational data aggregator 78, to which aggregation operations specific to specialist data types 80 can be added,
iii) customer network aggregate operational data 82, and
iv) an automatic security rule engine 86.

The operation of the network operational data aggregator will be explained below with reference to FIGS. 6 to 10. The customer network aggregate operational data 82 is generated by the network operational data aggregator 78. The operation of the automatic security rule engine 86 will be explained below with reference to FIG. 11.

Figure 3:
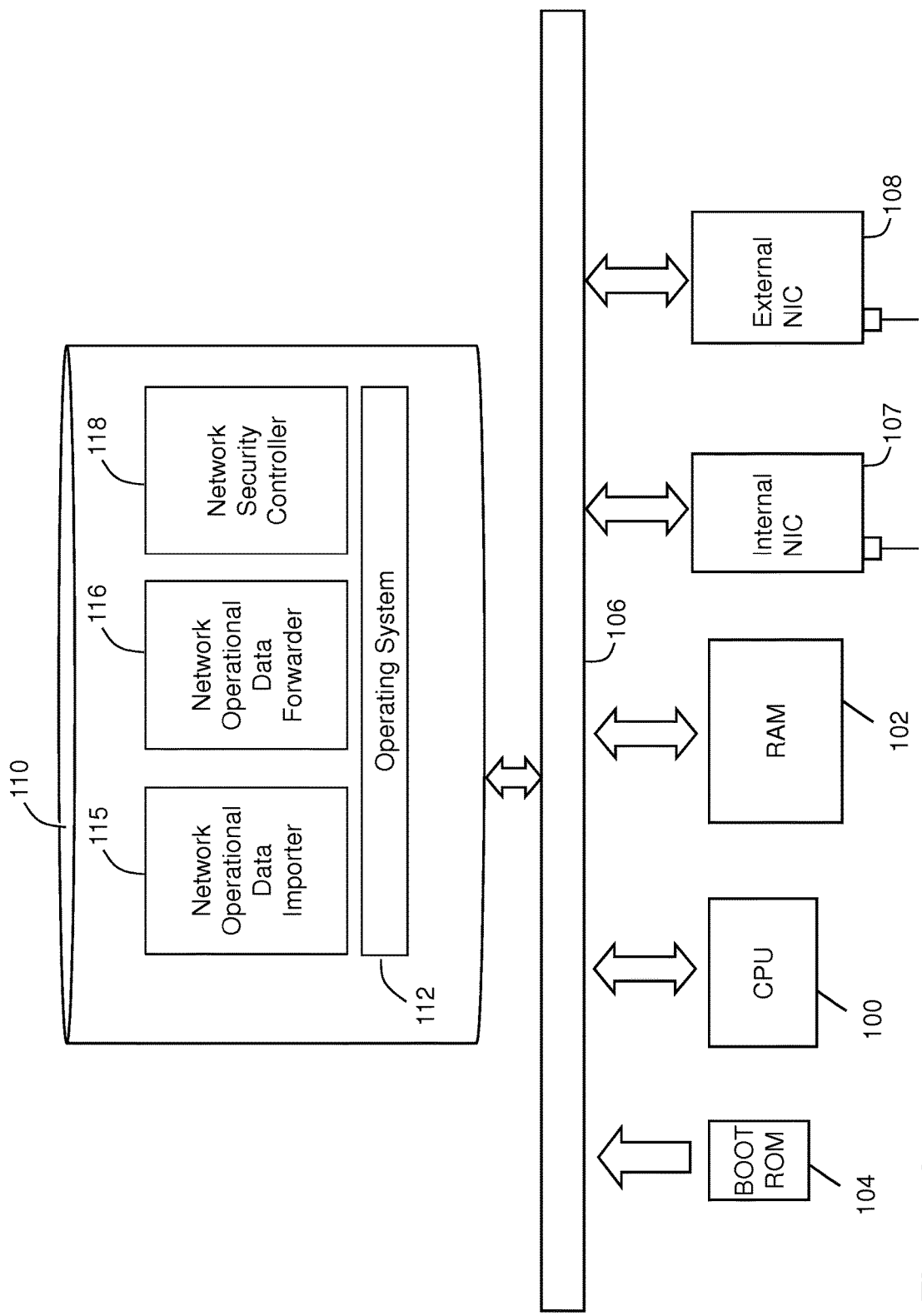
FIG. 3 shows the architecture of a customer network management node in the embodiment.
Figure 6:
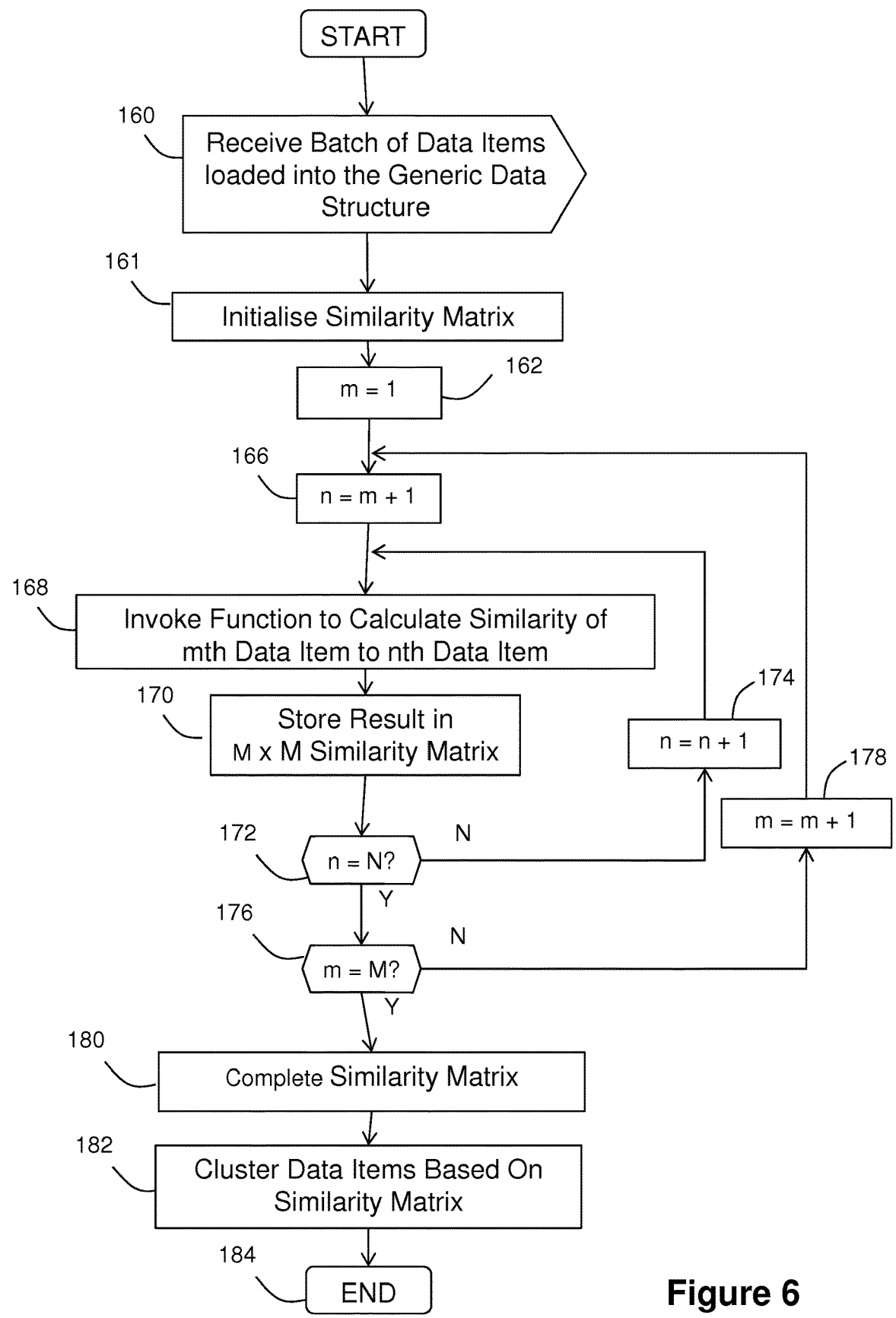
FIG. 6 shows a clustering process operated by the network coordinator.
Figure 7:
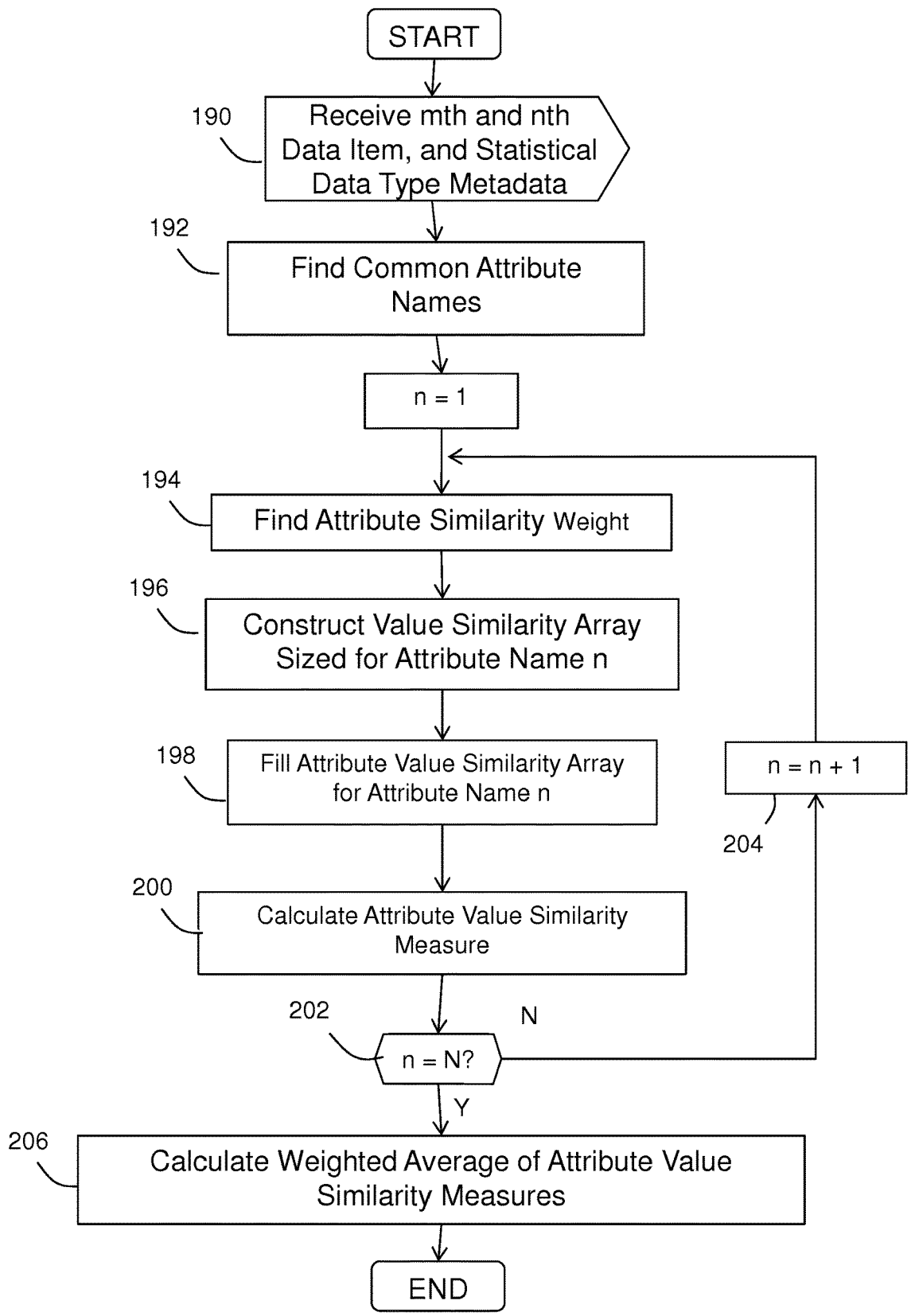
FIG. 7 shows the calculation of a network operational data item similarity measure which forms part of the clustering process of FIG. 6.

Turning now to the customer network 10, the customer network management node 20 comprises (FIG. 3) a central processing unit 100, a volatile memory 102, a read-only memory (ROM) 104 containing a boot loader program, and writable persistent memory—in this case in the form of a hard disk 110. The processor 100 is able to communicate with each of these memories via a communications bus 106.

Also communicatively coupled to the central processing unit 100 via the communications bus 106 are internal and external network interface cards 107, 108. The internal network interface card 107 provides a communications interface between the customer network management node 20 and the internal communications network 19. The external network interface card provides a communications interface between the customer network management node 20, and, via the firewall 22 and communications link 30, the security operations centre 40.

The hard disk 110 of the customer network management node 20 stores an operating system program 112, a network operational data importer 115, a network operational data forwarder 116, and a network security controller 118.

Figure 11:
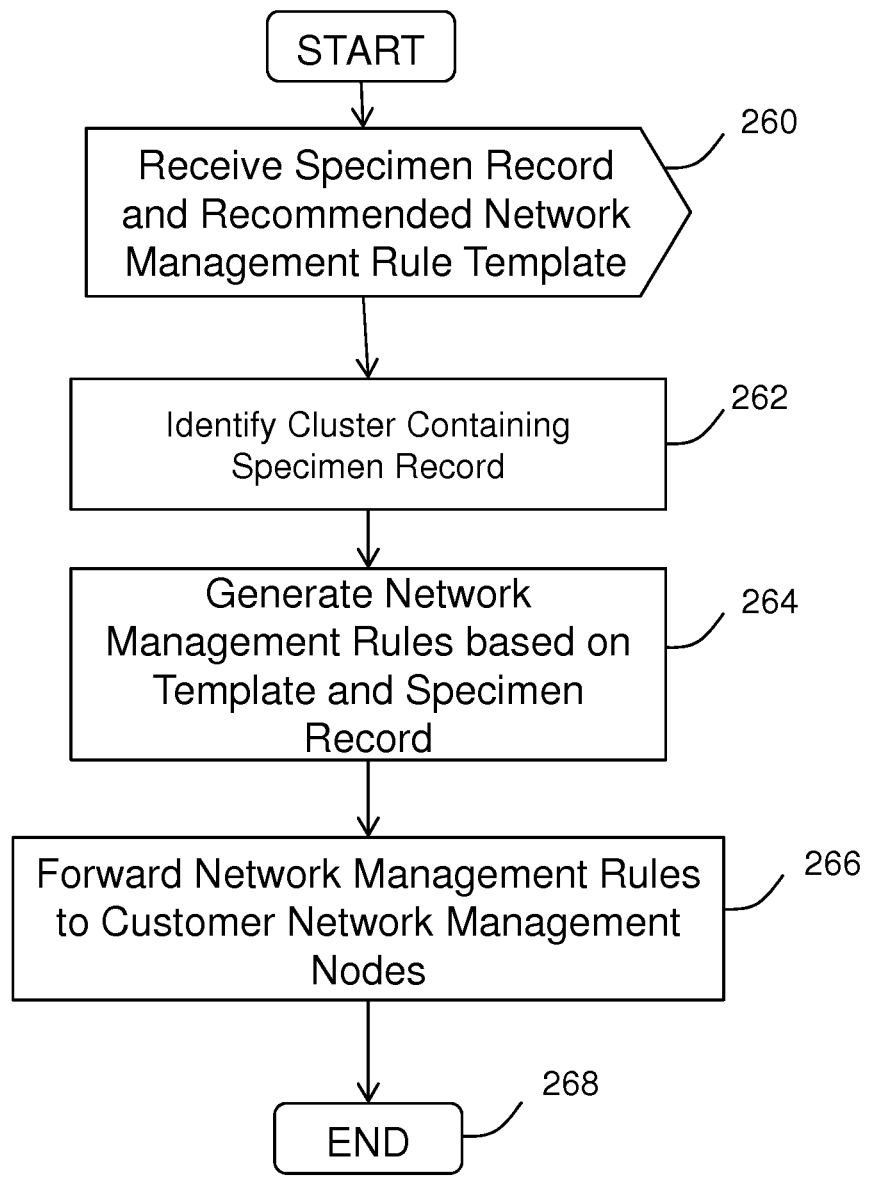
FIG. 11 shows an automatic network security control activity performed by the network coordinator and network security controller.

As will be explained below with reference to FIG. 11, network security controller 118 can process and execute requests originating from the security operations centre 40 designed to mitigate or terminate various attacks. For example, in reaction to a control message from the network coordinator 46 in the security operations centre 40, the network security controller 118 might issue a rule update to the customer's firewalls 12 causing them to prevent any access to the customer's network from an IP address specified in the updated rule, for an amount of time specified in the updated rule.

The network operational data importer 115 is arranged to receive or gather network operational data items from administrator-specified sources 12-18 within the customer site 10, and to process them in accordance with configuration instructions received from the administration console 21. The importer 115 can load data in a variety of formats, for example, Microsoft Excel spreadsheets, JavaScript Object Notation (JSON) files, XML files, comma-separated variable files or via a database connection. When the administrator specifies a source of network operational data, the administrator is able to select a subset of the attribute names for use in the automatic monitoring and control of the customer's network. The administrator can, of course, select all of the available sets of attribute values. In the present embodiment, for each of the selected sets of attribute values, the administrator provides, for each set of attribute values:

i) an attribute name (which might be different from an attribute name found in the source data);
  ii) the statistical data type to be associated with the attribute name;
  iii) where the statistical data type is quantitative, maximum and minimum values for the attribute; and
  iv) where the statistical data type is ordinal and the values are non-numeric, an ordered list of the possible values of the attribute. From this, the network operational importer 115 is able to generate and store a mapping R(x) between values of the attribute and the corresponding rank. The network operational importer 115 is also able to store the maximum ($max_R$) and minimum ($min_R$) possible rank values for this attribute. An example of R(x) when the possible values are "low", "medium" and "high" would be:

$$R(x) = \begin{cases} 1, & \text{if } x \text{ equals "low"} \\ 2, & \text{if } x \text{ equals "medium"} \\ 3, & \text{if } x \text{ equals "high"} \end{cases}$$

The generic data structure which the selected attributes of the data item are loaded into will be described below with reference to FIG. 4.

Returning to FIG. 3, the network operational data forwarder 116 is arranged to forward the processed network operational data items (now in the generic data format) to the network coordinator 46 via the communications link 30.

In order to assist in the description of the present embodiment, a first example of a network operational data item which might be imported by the network operational data importer 115 is set out below (referred to as Report A).

```
<xml version = "1.0"?>
<unusual traffic report>
    <source>
        <source address> 10.98.210.15 </source address>
        <source port> 19554 </source port>
    </source>
    <destination>
        <destination address> 10.98.214.76 </destination address>
        <destination port> 19274 </destination port>
    </destination>
    <flow lengths>
        <flow bytes> 127546 </flow bytes>
        <flow bytes> 213868 </flow bytes>
        <flow bytes> 5124 </flow bytes>
    </flow lengths>
    <severity> 5 </severity>
</unusual traffic report>
```

Those skilled in the art will recognise this as data marked up in accordance with an Extensible Markup Language (XML) derivative specified using XML. As will be understood by those skilled in the art, the data item includes a number of elements, each of which has a start tag (e.g. '<severity>'), some character data (e.g. "5"), and an end tag (e.g. </severity>). The character string in the start tag can be used as a name for an attribute of the data item, and the character data gives a value for that attribute for the current data item.

XML data items will usually have some associated schema information. Such schema information specifies the structure which data items must follow in order to be in accordance with the XML derivative. Hence, schema information can define elements to include other elements (for example the <source> element includes both <source address> and <source port> elements) or can define elements to include zero or more, or one or more instances of a given element. An example in the above data item is the <flow lengths> element which can be seen to be allowed to have a plurality of <flow bytes> elements within it. Often, schema information is specified using a Document Type Definition or an XML Schema.

The above data item can be seen to give three values for the attribute named 'flow bytes'.

Another example of a network operational data item which is formed in accordance with the same schema as Report A above is set out below (referred to as Report B):

```
<xml version = "1.0"?>
<unusual traffic report>
    <source>
        <source address> 10.101.212.101 </source address>
        <source port> 408 </source port>
    </source>
    <destination>
        <destination address> 10.101.214.126 </destination address>
        <destination port> 408 </destination port>
    </destination>
```

-continued

```
<flow lengths>
    <flow bytes> 426</flow bytes>
    <flow bytes> 104 </flow bytes>
</flow lengths>
<severity> 3 </severity>
</unusual traffic report>
```

It will be seen that there is a minor difference in structure of the second data item in comparison to the structure of the first data item—in particular, the second data item has a different number of <flow bytes> elements to the number of <flow bytes> elements in the first data item.

The values given for each attribute of the second data item are generally different to the values of the same attribute (i.e. the attribute having the same name) in the first data item.

In contrast to Report A, Report B can be seen to give two values for the attribute named 'flow bytes'.

The network operational data importer 115 loads each of the data items into a generic data structure (FIG. 4).

The name given to each attribute in the generic data structure is, in this embodiment, the name specified by the administrator at the time the new data source was specified. This conversion from the attribute name given in the raw data an administrator-specified attribute name can aid in enabling the comparison of data items from different data sources.

The generic data structure is generic in that it includes an unordered list of one or more attribute name—attribute value pairs. The generic data structure also includes metadata (in this case a data item identifier 130). The name-value pair structure can represent an attribute having a unique value (e.g. the 'Source IP Address' attribute 132), and can also represent an attribute having a plurality of values—as a plurality of name-value pairs (e.g. the 'Flow length Byte' attribute 134). It will be understood that the generic data structure is thus sufficiently flexible to allow the import of network operational data which comprises an arbitrary set of attribute names, and/or which provides a plurality of attribute values in association with a given attribute name. In this embodiment, each data item is converted into a generic data structure, before being forwarded by the network operational data forwarder 116 to the network coordinator 46. To give an example, the generic data structure for Report A above might take the following from (whilst this example is illustrated in JSON format, and hence the name-value pairs are separated by a colon, other formats using other delimiters could be used):

```
{
    "Id" : 4,
    "Data" : [
        "Source IP Address:10.98.210.15",
        "Source Port:19554",
        "Destination IP Address:10.98.214.76",
        "Destination Port:19274",
        "Flow length Byte:127546",
        "Flow length Byte:213868",
        "Flow length Byte:5124",
        "Severity:5"
    ]
}
```

Each attribute within each data item has an associated statistical data type. This too can be specified by the administrator using the network operational data importer 115, and then provided to the network coordinator 46 as part of, or in association with, the generic data structure (FIG. 4).

An example of a statistical data type mapping stored for each network operational data item at the network coordinator 46 is shown in FIG. 5. The table indicates, for each attribute name, the statistical data type to be associated with that attribute name.

Various classifications of statistical data types are known in the art. One categorises a set of data as being 'nominal', 'ordinal' or 'quantitative'. 'Quantitative' data can in turn be further categorised into 'interval' type data or 'ratio' type data.

Sets of nominal data cannot be meaningfully ordered. For example, the magnitude of a TCP port number in a flow record is of no significance—each TCP port number could be replaced with an arbitrarily chosen name—hence TCP port numbers are a nominal data type.

By contrast, sets of ordinal data do have an inherent order. For example, the severity of a syslog message can have seven values as follows:

| Code | Severity | Description |
| --- | --- | --- |
| 0 | Emergency | System is unusable |
| 1 | Alert | Action must be taken immediately |
| 2 | Critical | Critical conditions |
| 3 | Error | Error conditions |
| 4 | Warning | Warning conditions |
| 5 | Notice | Normal but significant condition |
| 6 | Informational | Informational messages |
| 7 | Debug | Debug-level messages |

It should be noted that the values in both the 'code' column in the above table, and the values in the 'severity' column are examples of ordinal data. It will be understood then by those skilled in the art that the statistical data type of a set of data values relates to what the data is representing, rather than representing how the data is stored.

Sets of quantitative data go beyond ordinal data in that, in addition to having an inherent order, the numerical difference between different values has meaning too. For example, the IN_BYTES field of a Cisco IOS NetFlow Version 9 record is a numerical value representing the number of bytes associated with an IP flow. Since the difference between, say a 100 byte flow and an 80 byte flow is the same as the difference between a 40 byte flow and a 20 byte flow, such data is an example of quantitative data.

In addition to the above-listed statistical data types, the present embodiment allows a user to store regular expressions 84 which match specialist data types into the network coordinator 46. The present embodiment also allows a user to provide a programmatic description 80 of an operation which might be performed on the data of a given type. For example, a description of the calculation of a measure of the similarity between two IPv4 addresses might be provided by the user along with a regular expression enabling the recognition of an IPv4 address.

Other possible examples of specialist data types include commonly used date/time formats. Furthermore regular expressions matching data types important to a particular domain can be provided along with specialist operations which apply to the domain-specific data types. It will be understood that the advantage of recognising a new data type comes not only from recognising the actual data type but from using that knowledge to better analyse the data. For example, as will be explained below, a distance metric uniquely designed for IP addresses might be provided along with a regular expression for the IP address type in order to provide a more useful distance metric to use when clustering the data. Without the identification of IP addresses the correct distance metric would not be applied and hence the clustering would not accurately reflect a true classification of the records.

Whilst the first and second network operational data items set out above accorded with a common schema, it is to be understood that the data aggregation processes set out below are equally able to compare data items having different schemas.

The operation of the network operational data aggregator 78 will now be described with reference to FIGS. 6 to 10.

The process (FIG. 6) for clustering a batch of network operational data items starts with the receipt 160 of a batch of M network operational data items loaded into the generic data structure (FIG. 4).

An M*M array for storing measures of similarity between the data items in the batch is initialised 161, setting its values to zero. Thereafter an outer loop of instructions (166-176) is repeated for each of the M data items in the batch. Within each iteration of the outer loop of instructions (i.e. for each data item), an inner loop of instructions (168-172) is repeated for each of the data items (other than the mth data item itself) which has not yet been compared to the mth data item.

The operation of the inner loop of instructions (168-172) invokes 168 a data item similarity calculation function to calculate the similarity of the mth and nth data item, passing that function the two data items, and their associated statistical data type tables (FIG. 5). The data item similarity calculation function will be described below with reference to FIGS. 7 to 10. The result returned by the data item similarity calculation function is then stored 170 in an M*M similarity matrix. This is followed by a test 172 to find whether the nth data item is the last of the data items to be compared to the current data item. If not, the counter n is incremented 174, and another iteration of the inner loop of instructions (168-172) is carried out to calculate another entry in the M*M similarity matrix. If the test 172 finds that the current data item is the last of the M data items to be compared to the current data item, then a further test 176 is carried out to find whether the current data item is the last of the M data items in the batch. If it is not the last of the M data items in the batch then m is incremented 178 and another iteration of the outer loop of instructions (166-176) is performed. If the test 176 finds that the current data item is the last of the M data items in the batch, then the M*M similarity matrix is completed 180 by setting the values in that matrix where m=n to 1 (since a data item is necessarily identical to itself), and copying the similarity value obtained by comparing the mth data item with the nth data item to the place in the matrix representing the comparison of the nth data item with the mth data item.

Once the M*M data item similarity matrix has been completed, a clustering procedure 182 is carried out in order to arrange the data items into clusters. Suitable clustering algorithms which can calculate clusters given similarity values for each pair of data items will be known to those skilled in the art. By way of example, a density-based clustering algorithm (such as DBScan introduced by Martin Ester, Hans-peter Kriegel, Jörg Sander, Xiaowei Xu in the paper "*A density-based algorithm for discovering clusters in large spatial databases with noise*" AAAI Press. 1996) could be used. Another possibility would be to use the Ordering points to identify the clustering structure (OPTICS) clustering algorithm presented in the paper "OPTICS: Ordering Points To Identify the Clustering Structure", by Mihael Ankerst, Markus M. Breunig, Hans-Peter Kriegel, and Jörg Sander in the proceedings of the 1999) ACM SIGMOD International Conference on Management of Data, ACM Press. pp. 49-60. Having calculated a set of clusters for the current block of records, the data aggregation process run by the network coordinator 46 ends 184.

The data identifying the clusters and the assignment of each network operational data item to a cluster forms the customer network aggregate operational data (FIG. 2: 82) in the present embodiment.

The data item similarity calculation function (FIG. 7) begins with the receipt 190, of the two data items to be compared and their associated statistical data type tables. The attribute names which the two data items have in common are then found 192, and then a sequence of steps (194-202) is carried out to find an attribute value similarity measure for each of the commonly named attributes.

The sequence of steps begins with the calculation 194 of a weight to be applied to the similarity measure found in relation to the current attribute name. The result of the calculation is stored in an attribute value similarity weight table (FIG. 8). In the present embodiment, the weight given to the attribute value similarity calculated in relation to each commonly named attribute is half of the sum of the number of values associated with that attribute name in the two data items.

In order to provide a mechanism which can handle commonly named attributes for which one or both of the data items provide only a single value, as well as commonly named attributes for which one or both of the data items provide a plurality of values, an attribute value similarity array is constructed 196 which is sized in dependence upon the number of attribute values given in association with the current attribute name in the two data items currently being compared. For cases where each of the data items provides a single attribute value in relation to a given attribute name, then the attribute value similarity array is constructed to store a single attribute value similarity for that attribute name. However, for attribute names for which one or both of the data items provide a plurality of attribute values, the similarity array has a number of elements which is fewer than the number of possible attribute value comparisons. It will be understood that the number of possible inter-data-item attribute value comparisons is equal to the product of the number of attribute values provided in relation to the attribute name in one of the data items multiplied by the number of attribute values provided in relation to the same attribute name in the other data item. In the present embodiment, the number of elements in the attribute value similarity array is restricted to the highest integer which is less than or equal to that product raised to the power of 0.75. This is, however, an empirically determined value, and any integer value which is less than the product of the number of attribute values provided in relation to the attribute name in the two data items and more than the square root of the product (i.e. more than the geometric mean of the number of attribute values provided in relation to the common attribute name in the two data items) could be used instead.

To help illustrate a use of the present embodiment, for the specific data items given above, the product of the number of values provided for the 'Flow length Byte' attribute of the two data items would be six; raising six to the power of 0.75 gives an answer of 3.83, meaning that three elements are provided in the attribute value similarity array for the 'Flow length Byte' attribute. Both data items give a single value in relation to each of the other attribute names, so the attribute value similarity arrays for those attribute names have only one element.

Figure 9:
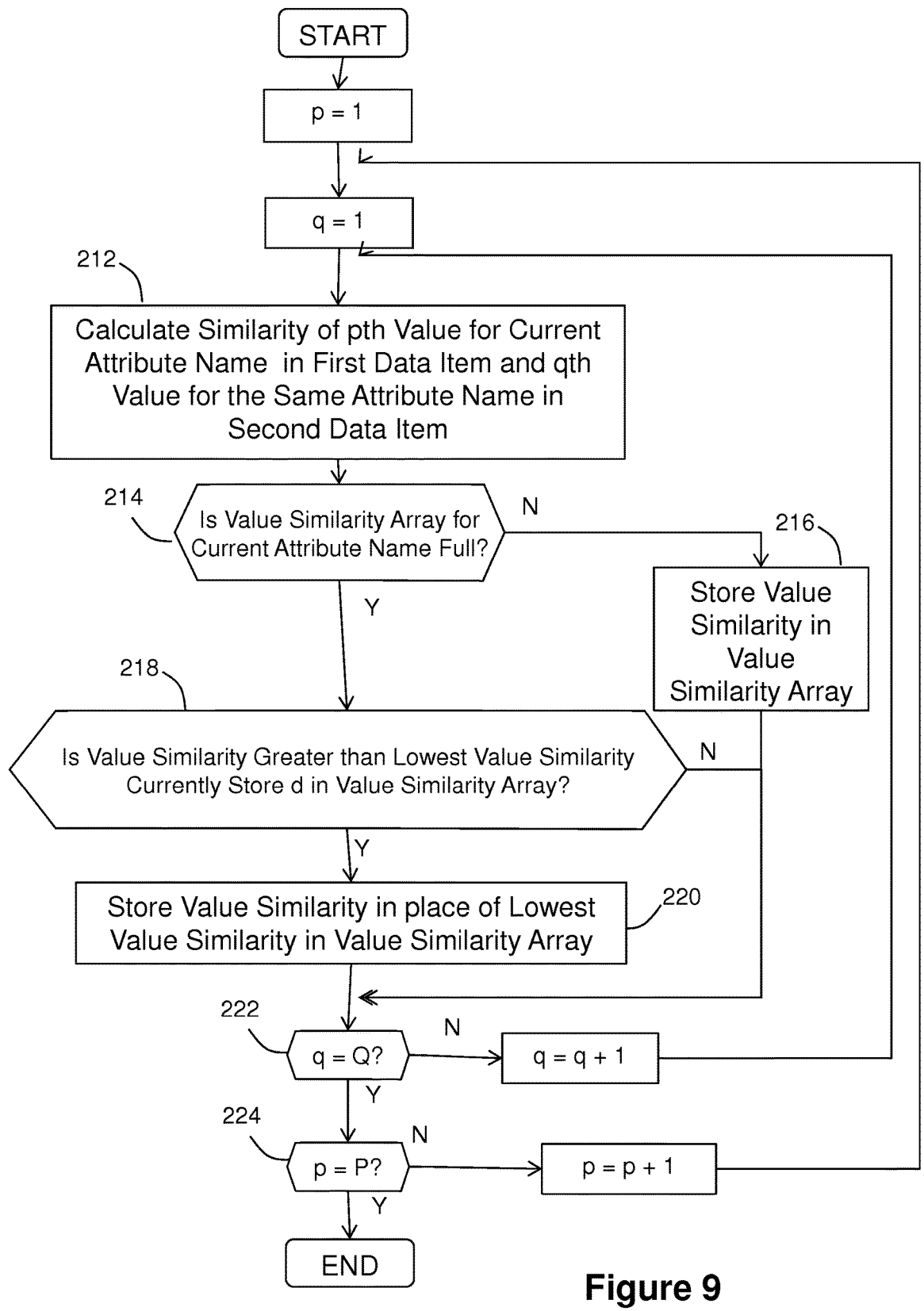
FIG. 9 shows a process for calculating attribute value similarity measures for each of the attribute names common to the two network operational data items.
Figure 10:
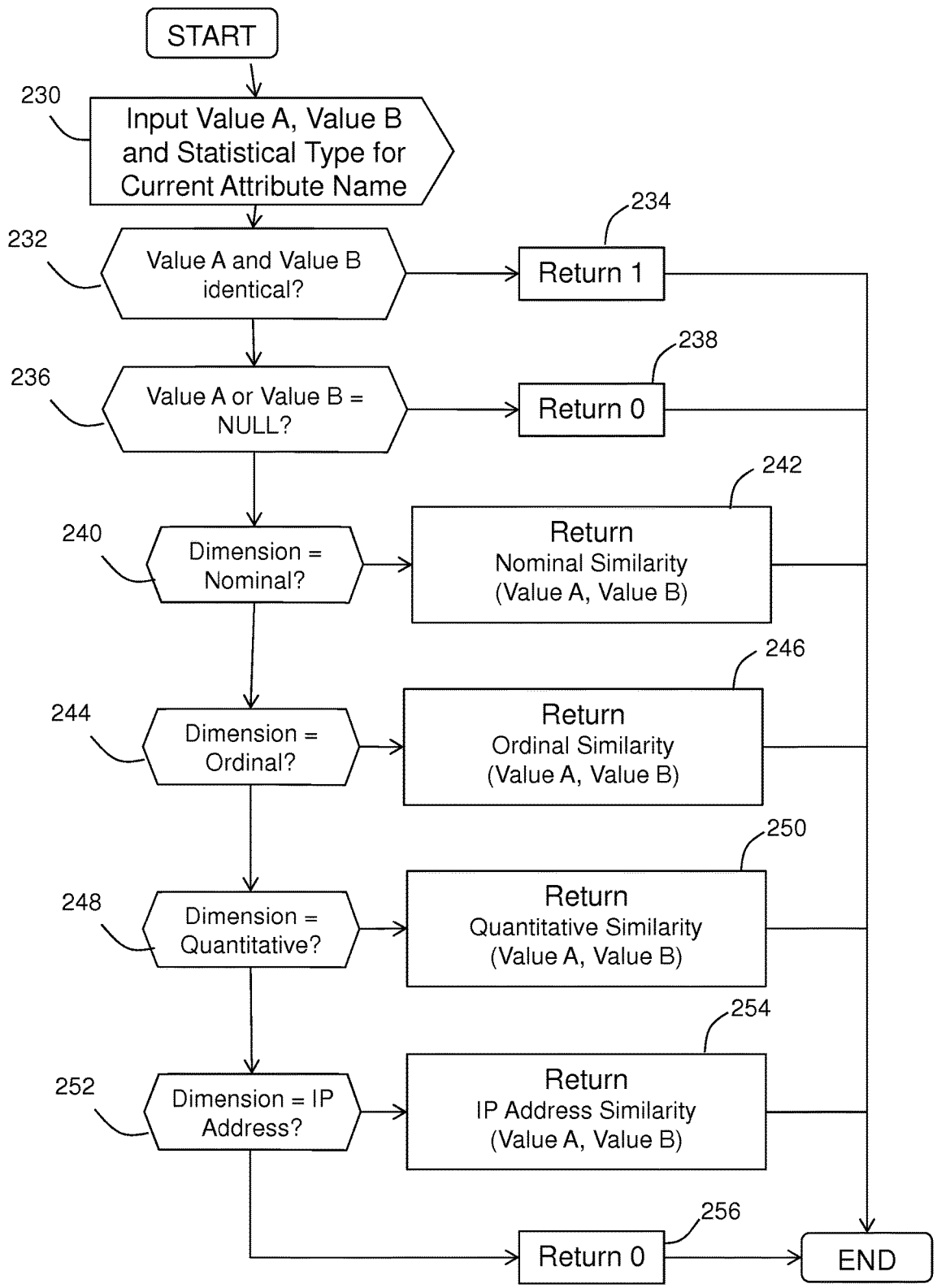
FIG. 10 shows how the calculation of attribute value similarity depends upon the statistical data type of values provided in association with the current attribute name.

Having created the attribute value similarity array, the elements in the array for the current attribute name are filled 198 with attribute value similarities as will be explained below with reference to FIGS. 9 and 10. Once the attribute value similarity array has been filled for the current attribute name, then the values in the attribute value similarity array are summed 200 to give an attribute value similarity measure for the current attribute name.

A test 202 then finds whether the current attribute name is the last of the common attribute names to be considered. If it is not, then another iteration of the sequence of steps (194-202) is carried out. If the current attribute name is the last of the common attribute names to be considered, then a weighted average of the attribute value similarity measures is calculated 202 in order to arrive at the data item similarity measure to be stored (FIG. 6: 170) in the M*M similarity matrix. The weight given to each attribute value similarity measure is the attribute value similarity weight calculated in step 194.

The way in which the attribute value similarity array is filled will now be described with reference to FIG. 9. The process carries out a set of instructions (212-220) for each possible pairing of an attribute value provided for the current attribute name in the first data item and an attribute value provided for the same attribute name in the second data item.

The first step carried out for each pairing is to calculate 212 an attribute value similarity for the two values in the current pairing. The similarity calculation depends upon the statistical data type associated with the current attribute name as will be explained below with reference to FIG. 10.

The calculation is followed by a test 214 to find whether the attribute value similarity array for the current attribute name is full. If the array is not full, then the attribute value similarity is stored in the array, and a test 224 is carried out to find whether the current pairing is the last of the possible value pairings for the current attribute name. If so, the process ends, otherwise another iteration of the set of instructions (212-220) is performed.

If the test 214 finds the attribute value similarity array to be full, then a further test 218 is carried out to see whether the attribute value similarity is greater than the lowest attribute value similarity present in the attribute value similarity array. If so, then the lowest attribute value similarity is replaced 220 with the attribute value similarity for the current pairing.

In addition to depending upon the two attribute values, the attribute value similarity for each pairing depends upon the statistical data type provided for the current attribute name as will now be explained with reference to FIG. 10. The attribute value similarity calculation function starts with the input 230 of the two attribute values in the current pairing and the statistical data type provided for the current attribute name. An equality test 232 then finds whether the two attribute values are identical. If the two attribute values are identical then the function returns a attribute value similarity of 1 and ends. If the two attribute values are not identical, then a nullity test 236 is carried out. If one of the attribute values is null, then the function returns 238 zero and ends. A series of tests (240-252) then applies an attribute value similarity calculation (242-254) which depends upon the statistical data type associated with the current attribute name.

When the statistical data type associated with the current attribute name is nominal, then the similarity is simply calculated 242 to be one if the two values are the same, or zero if they are different.

$$sim(a_i, b_i)_{nominal} = \begin{cases} 1, & a_i = b_i \\ 0, & a_i \neq b_i \end{cases} \quad \text{Equation 1}$$

When the statistical data type is ordinal or quantitative, the similarity calculation proceeds in two steps.

In a first step, the distance between the attribute values is calculated, and in a second step, the calculated distance is converted into a similarity.

In the case of an attribute name associated with values which are of an ordinal data type, the distance is calculated as the rank difference between the two attribute values, divided by the rank difference between the highest ranked value of the attribute and the lowest ranked value of the attribute.

$$d_{ordinal} = \frac{|R(a_i) - R(b_i)|}{\max_R - \min_R} \quad \text{Equation 2}$$

In the case of an attribute name associated with values which are of a quantitative data type, the distance is calculated as the absolute numerical difference between the two attribute values, divided by the range of attribute values calculated as the difference between the maximum and minimum attribute values given in relation to the current attribute name by the administrator:

$$d_{quantitative} = \frac{|a_i - b_i|}{\max - \min} \quad \text{Equation 3}$$

Various functions can be used to convert the distance into a similarity. Those functions are order-reversing (i.e. if a distance between a first pair of attribute values is greater than the distance between a second pair of attribute values then the similarity between the second pair of attribute values is greater than the similarity between the first pair of attribute values) and the two functions used in this embodiment produce a similarity between zero and one.

In the case of attribute names associated with values that are of a quantitative statistical data type, the distance is converted to a similarity in accordance with the following equation:

$$sim(d) = \frac{e^{-d} - e^{-1}}{1 - e^{-1}} \quad \text{Equation 4}$$

where d is calculated in accordance with Equation 3 above.

In the case of attribute names associated with values which are of an ordinal statistical data type, the distance is converted to a similarity simply by subtracting the distance from one.

Either conversion function could be used in each case, but Equation 4 gives higher similarities (i.e. gives more weight) to nearly identical attribute values. By raising the base of the exponentiations in Equation 4 (e.g. from e to 10), even more weight, relatively speaking, is given to nearly identical attribute values.

The attribute value similarity calculation function is extensible in that modules can be added which provide an attribute value similarity calculation for specialist data types. For example, in the present embodiment, if the IP Address type test 252 finds that the values of the current attribute are of a specialist data type, for example IPv4 address, then the similarity between the two addresses might be found by utilising a specialised function for finding the similarity between the two IPv4 addresses. To give an example of such a specialist similarity calculation function, the similarity function for IPv4 addresses might return a result dependent upon the length of the match between the two IPv4 addresses, starting at the most significant bit of the address. If none of the four quadrants of the two IPv4 addresses match, then a similarity value of zero is returned. If the first quadrants match, but the second quadrants do not match, then a value of 0.5 is returned. If first and second quadrants match, but the third quadrant does not match, then a value of 0.75 is returned. If the first, second and third quadrants match, but the fourth quadrants do not match, then a value of 0.875 is returned. If the two IPv4 addresses are identical then a value of 1 will have been returned previously 234.

It will be remembered that the value similarity calculation (FIGS. 9 and 10) is nested within the data item similarity calculation (FIG. 7) which in turn is nested within the data item clustering process (FIG. 6) which builds the customer network aggregate operational data 82 stored at the network co-ordinator 46.

As will now be explained with reference to FIG. 11, the automatic security rule engine 80 of the network coordinator 46 uses that customer network aggregate operational data 82 in cooperating with the network security controller 118 of the customer network management node 20 to mitigate or terminate attacks against the security of the customer network 40.

The automatic security rule engine 80 receives 260 a specimen network operational data item which is known to be associated with a security breach or an attempted security breach. This could, for example, be report A used as an example above—as follows:

```
<xml version = "1.0"?>
<unusual traffic report>
    <source>
        <source address> 10.98.210.15 </source address>
        <source port> 19554 </source port>
    </source>
    <destination>
        <destination address> 10.98.214.76 </destination address>
        <destination port> 19274 </destination port>
    </destination>
    <flow lengths>
        <flow bytes> 127546 </flow bytes>
        <flow bytes> 213868 </flow bytes>
        <flow bytes> 5124 </flow bytes>
    </flow lengths>
    <severity> 5 </severity>
</unusual traffic report>
```

Owing to the present embodiment being able to compare data items having different structures, this data item will be clustered with data items like report B used as an example above.

The automatic security rule engine 80 then identifies 262 the cluster containing the specimen data item. For each of the data items in the cluster, the automatic security rule engine generates 264 rules which tell firewalls at the customer network to block packets from the source address and port taken from each of the data items in the cluster. Those rules will be accompanied by an expiry time.

Having generated those rules, the automatic security rule engine 80 sends 266 those rules to the network security controller 118 which forwards those rules to the firewalls 12, 22 in order to mitigate or prevent the security breach or attempted security breach typified by the specimen record received at the beginning of the attack response.

Possible variations on the above embodiment include (this list is by no means exhaustive):

i) In the above embodiment, attribute description data including:
  a) an attribute name;
  b) a statistical data type of the values given for the attribute; and
  c) a range for attributes whose values are of ordinal or quantitative statistical data types, was used in classifying network operational data items. In alternative embodiments, the statistical data type and ranges might not be used, in which case the similarity calculation could simply test for equality of the two values—as seen in equation 1 above.

ii) In the above embodiment, the administrator provided a name, a statistical data type for each attribute, and a range of possible values for each attribute where those values are indicated to be of a ordinal or quantitative statistical data type. In other embodiments, one, two or all three of these might be derived automatically from the network operational data itself.

To obtain a name for each attribute automatically, the importer might find character strings in the input data which match predefined criteria. Many data items contain semantic markup which provides a character string which indicates what the values in each element of that data item mean. In files of records, each record consists of a fixed number of fields, each having a fixed format. The file can include a character string for each field which can indicate what the values in each field mean. For example, the importer 115 could extract attribute names from the headers of columns in a file or spreadsheet, or from the text in the XML tags surrounding the value in a data item written in an XML derivative. If no attribute name can be found in the source data, then a name can be automatically assigned to each attribute of the source data.

To obtain the statistical data type of attribute values given for an attribute name automatically, the importer might derive the statistical data types by looking at the statistical properties of the values of each attribute in the network operational data items, for example using the method set out in the applicant's co-pending patent application filed on the same day as the present application (applicant's reference A32604 EPp).

In the case of an attribute name which has associated values of an ordinal or statistical data type, a range for the possible values of the attribute could be obtained by finding the highest value and lowest value given for an attribute with that name in the current batch of data items and use those as the maximum and minimum values used in the distance calculation respectively.

iii) in the above embodiment, the data items were expressed in an XML derivative. The embodiment would work with data items expressed in many other data item formats or languages;

iv) in the above embodiment, an attribute value similarity measure was calculated for an attribute name with a plurality of values in one data item, and one or more values in the other data item. The number of value comparisons, broadly, rises quadratically with the number of values given for the attribute name in each data item. In order to prevent the attribute value similarity measure from being diluted by any distribution of the values given for the attribute name in each data item, the above embodiment only took the highest value similarity measures into account, and disregarded the lower value similarity measures. However, there are many other ways in which embodiments might aggregate the pairwise value similarity measures in a manner which weights higher value similarity measures more heavily than lower value similarity measures. For example, an ordered weighted averaging aggregation operator could be used. In the specific example given above, if the weights of the highest three pairwise similarity contributions were set to $(1/((xy)^{\wedge}0.75))$ (where xy is the number of pairwise comparisons), and the remaining weights are set to zero, then an embodiment similar to the above-described first embodiment results. In other embodiments, the weights could tail off continuously instead of undergoing a step change from a constant value to zero—for example, the weights could tail off quadratically, linearly or exponentially. In most embodiments, the weights would be normalised so that they sum to 1. However, in other embodiments, the weights could be normalised so that they sum to the attribute value similarity weight, and the attribute value similarity weight calculation (FIG. 7: 194) could be omitted.

v) In the embodiment described above, the attribute value similarity weight was set to half the sum of the number of values given in relation to the attribute name in each of the two data items. A weighted average of the attribute value similarity measures was calculated, with each attribute value similarity measure being weighted by the attribute value similarity weight for that particular attribute name. The same mathematical result could instead be arrived at by using attribute value similarity weights equal to the number of values provided in the two data items for the attribute name in question.

vi) The above embodiment included a specific example (IPv4 address) of a specialist data type, and illustrated how such a specialist data type could be subject to a specialised similarity measure rather than a similarity measure associated with the statistical data type of the values of the attribute. Other specialist data type could be specified, along with an indication or specification of a bespoke similarity measure calculation suited to that specialist data type. For example, a specialist data type of English words could be defined, and a bespoke similarity measure in that case might be a text similarity function that computes how similar two words are and returns a value between 0 and 1. This might include making a call to an external service to calculate a similarity between two words or two pieces of text. Any specialist data type for which a similarity calculation can be provided could be added, other examples of possible specialised data types include product keys, or dates/times. Once a software module for carrying out the specialist similarity calculation is provided to the network co-ordinator 46, it can be used within the value similarity measure calculation (FIG. 10).

vii) In the above embodiment, an administrator is provided with a user interface which enables the administrator to select only a subset of the sets of attribute values found in a data item to be taken into account in calculating data item similarity. In other embodiments, this selection facility might not be provided, so that every one of the attributes in each of the data items being compared is considered when classifying network operational data items.

viii) In embodiments partway between relying on the administrator to provide an attribute name to be associated with a set of values, and deriving those names automatically from the input data item, the administrator might be asked to approve the attribute names automatically identified by the importer 115.

ix) The customer network management node could filter (positively or negatively) messages from the various devices in the customer's network.

x) In the above embodiment, the classification and reactive network control was carried out by the network coordinator 46. However, in other embodiments, the functions of the network coordinator might instead be carried out by the customer network management node 20—i.e. the managed security service might be deployed using only software and hardware installed at the customer site.

xi) in the above embodiment, a generic data structure was provided which, by expanding a list of n attribute values given in association with a single attribute name into a list of n (attribute name, attribute value) pairs, was able to handle data items which provide plural attribute values in association with a given attribute name. However, other generic structures could be used—for example, the data items could be represented using indexed arrays, as illustrated below:

```
{
    "Id" : 4,
    "Data" : [
        ["10.98.210.15"],
        ["19554"],
        ["10.98.214.76"],
        ["19274"],
        ["127546", "213868", "5124"],
        ["5"]
    ]
}
```

With some metadata for the whole dataset (i.e. it's not per data item, it applies across all data items)—giving an indication of the index of the attribute name

```
{
    "AttributeNameIndex" : {
        "Source IP Address" : 0,
        "Source Port" : 1 ,
        "Destination IP Address" : 2,
        "Destination Port" : 3,
        "Flow length Byte" : 4,
        "Severity" : 5
    }
}
```

In summary of the above disclosure, a method of operating a communications network is disclosed. In order to manage a network, it is first necessary to establish the state the network is in. This is difficult in practice because the network operational data stored and transmitted in the network takes a myriad of forms owing to the variety of suppliers and types of network equipment. There is a need to distil that network operational data down to aggregate network operational data which can be taken to provide an indication of the state of the network which is of a manageable size, and to which network management apparatus can react by sending control commands to the network. The problem of generating aggregate network operational data is difficult because of the heterogeneity of network operational data items. By finding attribute names in different network operational data items which match one another, and then comparing attribute values provided from those matching attribute names, a comparison of heterogeneous network operational data items is enabled. This enables the production of network aggregate data which more accurately reflects the operational state of the network. This in turn leads to the network management apparatus controlling the network to operate in a more efficient manner than has hitherto been possible.

The invention claimed is:

1. A method of managing a communications network comprising:
   obtaining a plurality of network operational data items relating to the operation of said communications network, each of said network operational data items comprising one or more attributes, each attribute comprising an attribute name and one or more values for that attribute, at least one of said network operational data items providing a plurality of values for each of one or more attributes;
   calculating, for each two-way combination of network operational data items, a data item similarity measure by comparing the two network operational data items in the two-way combination, each of said data item similarity measures being calculated by:
   a) comparing names of attributes to identify one or more commonly named attributes in the two network operational data items; and
   b) calculating, for each of said one or more commonly named attributes, an attribute value similarity measure;
   wherein, for cases where at least one of the two network operational data items in the two-way combination provides a plurality of values for a commonly named attribute, said attribute value similarity measure calculation comprises:
   i) finding, for each of the plurality of values provided for said commonly named attribute in said at least one network operational data item, an attribute value similarity component with respect to each of the one or more values provided for said commonly named attribute in the other network operational data item; and
   ii) aggregating the attribute value similarity components to calculate said attribute value similarity measure for said commonly named attribute;
   classifying network operational data items into classes in dependence upon said data item similarity measures; and
   operating a network controller to send control commands to the network to automatically apply common class-specific treatment in response to network operational data items in one of said classes.

2. A method according to claim 1 wherein said aggregation of said attribute value similarity components comprises calculating a weighted sum of said attribute value similarity components in which higher attribute value similarity components are given a higher weight than lower attribute value similarity components.

3. A method according to claim 1, wherein the two network operational data items in the two-way combination have two or more commonly named attributes, said data item similarity value calculation comprising aggregating the attribute value similarity measures for the two or more commonly named attributes to find said data item similarity measure.

4. A method according to claim 3 wherein the aggregation of said attribute value similarity measures comprises calculating a weighted sum of said attribute value similarity measures.

5. A method according to claim 4 wherein the weight applied to each attribute value similarity measure depends upon the number of values provided for the commonly named attribute in the two network operational data items.

6. A method according to claim 5 wherein said weight is proportional or equal to the total number of values provided for said commonly named attribute in the two network operational data items.

7. A method according to claim 1 further comprising:
   obtaining, in relation to one or more of said attribute names, a data type indication indicating the type of data values provided for that attribute, said attribute value similarity measure calculation depending upon said data type indication.

8. A method according to claim 7 wherein said data type indication comprises a statistical data type indication.

9. A method according to claim 1, further comprising providing an administrator with a user interface enabling the selection of a subset of said attribute names to be taken into account in classifying said network operational data items.

10. Network control apparatus comprising:
    a receiver arranged in operation to receive a plurality of network operational data items relating to an operation of a communications network, each of said network operational data items comprising one or more attributes, each attribute comprising an attribute name and one or more values for that attribute, at least one of said network operational data items providing a plurality of values for each of one or more attributes;
    a network operational data item classifier arranged in operation to:
    calculate, for each two-way combination of network operational data items, by comparing the two network operational data items in the two-way combination, a data item similarity by:
    a) comparing names of attributes to identify one or more commonly named attributes in the two network operational data items; and
    b) calculating, for each of said one or more commonly named attributes, an attribute value similarity measure;
    wherein, for cases where at least one of said the two network operational data items in the two-way combination provides a plurality of values for a commonly named attribute, said attribute value similarity measure calculation comprises:
    i) finding, for each of the plurality of values provided for said commonly named attribute in said at least one network operational data item, an attribute value similarity component with respect to each of the one or more values provided for said commonly named attribute in the other network operational data item; and
    ii) aggregating the attribute value similarity components to calculate said attribute value similarity measure for said commonly named attribute;
    classify network operational data items into classes in dependence upon said data item similarity measures; and a network controller arranged in operation to automatically apply common class-specific treatment in response to network operational data items in one or more of said classes found by said classifier.

11. The network control apparatus according to claim 10 wherein said aggregation of said attribute value similarity components comprises a calculation of a weighted sum of said attribute value similarity components in which higher attribute value similarity components are given a higher weight than lower attribute value similarity components.

12. The network control apparatus according to claim 10, wherein the two network operational data items in the two-way combination have two or more commonly named attributes, said data item similarity value calculation comprises an aggregation of the attribute value similarity measures for the two or more commonly named attributes to find said data item similarity measure.

13. The network control apparatus according to claim 12 wherein the aggregation of said attribute value similarity measures comprises a calculation of a weighted sum of said attribute value similarity measures.

14. The network control apparatus according to claim 13 wherein the weight applied to each attribute value similarity measure depends upon the number of values provided for the commonly named attribute in the two network operational data items.

15. The network control apparatus according to claim 14 wherein said weight is proportional or equal to the total number of values provided for said commonly named attribute in the two network operational data items.

16. The network control apparatus according to claim 10 wherein the network control apparatus is configured to:
obtain, in relation to one or more of said attribute names, a data type indication indicating the type of data values provided for that attribute, said attribute value similarity measure calculation depending upon said data type indication.

17. The network control apparatus according to claim 16 wherein said data type indication comprises a statistical data type indication.

18. The network control apparatus according to claim 10, wherein the network control apparatus is configured to:
provide an administrator with a user interface enabling the selection of a subset of said attribute names to be taken into account in classifying said network operational data items.

19. The network control apparatus according to claim 10, wherein
the automatic application of the common class-specific treatment includes providing a same countermeasure to communications network elements which are represented by network operational data items assigned to a common class and are malicious.

20. A computer-implemented method of classifying network operational data comprising:
obtaining a plurality of network operational data items relating to an operation of a communications network, each of said network operational data items comprising one or more attributes, each attribute comprising an attribute name and one or more values for that attribute, at least one of said network operational data items providing a plurality of values for each of one or more attributes;
calculating, for each two-way combination of network operational data items, by comparing the two network operational data items in the two-way combination, a data item similarity measure by:
a) comparing names of attributes to identify one or more commonly named attributes in the two network operational data items; and
b) calculating, for each of said one or more commonly named attributes, an attribute value similarity measure;
wherein, for cases where at least one of said the two network operational data items in the two-way combination provides a plurality of values for a commonly named attribute, said attribute value similarity measure calculation comprises:
i) finding, for each of the plurality of values provided for said commonly named attribute in said at least one network operational data item, an attribute value similarity component with respect to each of the one or more values provided for said commonly named attribute in the other network operational data item; and
ii) aggregating the attribute value similarity components to calculate said attribute value similarity measure for said commonly named attribute;
classifying network operational data items into classes in dependence upon said data item similarity measures; and
operating a network controller to send control commands to the network to automatically apply common class-specific treatment in response to network operational data items in one of said classed.

* * * * *